United States Patent
Feiring et al.

(10) Patent No.: US 6,299,792 B1
(45) Date of Patent: Oct. 9, 2001

(54) HALOGENATED HYDROCARBON REFRIGERANT COMPOSITIONS CONTAINING POLYMERIC OIL-RETURN AGENTS

(75) Inventors: Andrew Edward Feiring, Wilmington; Lois Lo-I Lin, Newark; Barbara Haviland Minor, Elkton; Glenn Scott Shealy, Hockessin, all of DE (US); Hans O. Spauschus, deceased, late of Jonesboro, GA (US), by Ann Hosley Spauschus, executrix

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/231,847

(22) Filed: Jan. 15, 1999

Related U.S. Application Data

(60) Provisional application No. 60/071,652, filed on Jan. 16, 1998.

(51) Int. Cl.$^7$ .................................................. C09K 5/04
(52) U.S. Cl. ................................................ 252/68; 252/67
(58) Field of Search ........................................ 252/68, 67

(56) References Cited

U.S. PATENT DOCUMENTS

| | | | | |
|---|---|---|---|---|
| 2,912,383 | * | 11/1959 | Huth ....................................... | 252/68 |
| 5,017,300 | * | 5/1991 | Raynolds ............................... | 252/67 |
| 5,351,499 | | 10/1994 | Takemasa ............................... | 62/114 |
| 5,492,643 | * | 2/1996 | Weber, III .............................. | 252/68 |
| 5,622,644 | | 4/1997 | Stevenson et al. ...................... | 252/67 |
| 5,637,142 | * | 6/1997 | Kubo et al. ............................. | 106/285 |
| 5,792,383 | * | 8/1998 | Reyes-Gavilan et al. .............. | 252/68 |

FOREIGN PATENT DOCUMENTS

| | | | | |
|---|---|---|---|---|
| 293364 | * | 8/1991 | (DE) . | |
| 293 364 A5 | | 8/1991 | (DE) ............................ | C10M/171/02 |
| 0 123 575 | | 10/1984 | (EP) ............................... | C10M/1/32 |
| 0557796 | * | 9/1993 | (EP) . | |
| 0 565 118 A1 | | 10/1993 | (EP) . | |
| 61-130389 | * | 6/1986 | (JP) . | |
| 3-93895 | | 4/1991 | (JP) . | |
| 4-275397 | | 9/1992 | (JP) . | |
| 9-67291 | | 3/1997 | (JP) . | |
| 9-227884 | | 9/1997 | (JP) . | |
| WO 93/07231 | | 4/1993 | (WO) . | |
| 96/07721 | * | 3/1996 | (WO) . | |

OTHER PUBLICATIONS

James J. Jetter And F. R. Delafield, Retrofitting with HFC–134a, Additives, and Mineral Oil, *National Technical Information Service*, May 1–10, 1994.

Pierandrea Lo Nostro, Chwen Yuan Ku, Sow–Hsin Chen, Jar–Shyong Lin, Effect of a Semifluorinated Copolymer on the Phase Separation of a Fluorocarbon/Hydrocarbon Mixture, *Journal of Physical Chemistry*, 99, 10858–10864, 1995, no month available.

Jose L. Reyes–Gavilan, Crandall B. Barbour, Enhanced Naphthenic Refrigeration Oils for Household Refrigerator Systems, *Ashrae Transactions: Research*, 103, 95–106, 1997, no month available.

* cited by examiner

*Primary Examiner*—Margaret Einsmann

(57) ABSTRACT

Refrigerant compositions containing polymeric oil-return agents which solubilize or disperse mineral and synthetic oil lubricants with hydrofluorocarbon and hydrofluorocarbon/hydrochlorofluorocarbon-based refrigerants are disclosed. These polymeric oil-return agents, such as copolymers of fluorinated and non-fluorinated methacrylates, as a small proportion of an overall refrigerant composition, permit efficient return of mineral and synthetic oil lubricants from non-compressor zones back to a compressor zone in a refrigeration system operating with hydrofluorocarbon and hydrofluorocarbon/hydrochlorofluorocarbon-based refrigerants.

16 Claims, No Drawings

HALOGENATED HYDROCARBON REFRIGERANT COMPOSITIONS CONTAINING POLYMERIC OIL-RETURN AGENTS

CROSS REFERENCE TO RELATED APPLICATIONS

This application claims the priority benefit of U.S. Provisional Application 60/071,652, filed Jan. 16, 1998.

FIELD OF THE INVENTION

The present invention relates to compositions containing polymeric oil-return agents which solubilize or disperse mineral and synthetic oil lubricants with halogenated hydrocarbon refrigerants, permitting efficient return of lubricants from non-compressor zones back to a compressor zone in a refrigeration system.

BACKGROUND OF THE INVENTION

Mineral oils and alkylbenzenes have been conventionally used as lubricants in chlorofluorocarbon-based (CFC) refrigeration systems. However, the lack of solubility of these lubricants in the replacement, non-ozone depleting, hydrofluorocarbon (HFC) refrigerants has precluded their use and necessitated development and use of alternative lubricants for HFC refrigeration systems based on polyalkylene glycols (PAGs) and polyol esters (POEs). While the PAGs and POEs are suitable lubricants for HFC-based refrigeration systems, they are extremely hygroscopic and can absorb several thousand ppm (parts per million) of water on exposure to moist air. This absorbed moisture leads to problems in the refrigeration system, such as formation of acids which resultant in corrosion of the refrigeration system and formation of intractable sludges. In contrast, mineral oils and alkylbenzenes are much less hygroscopic and have low solubility, less than 100 ppm, for water. Additionally, PAG and POE lubricants are considerably more expensive than the hydrocarbon lubricants, typically on the order of three to six times more expensive. As a consequence, there is a need and an opportunity to resolve this solubility problem so that the refrigeration industry may utilize mineral oil and alkylbenzene lubricants with HFC-based refrigerants.

Hydrochlorofluorocarbon (HCFC) refrigerants are also replacing CFCs, and in instances as mixtures with HFCs. These HCFC-based refrigerant mixtures are less soluble than CFCs in conventional refrigeration lubricants such as mineral oil. A lubricant change from mineral oil to alkylbenzene is often required when the HCFCs or HCFC/HFC mixtures are used to replace pure CFC-based based refrigerants, resulting in more expense to the refrigeration industry. Consequently, there is a need and opportunity to resolve this low solubility problem so that the refrigeration industry may utilize HCFC and HCFC/HFC-based refrigerants with mineral oil lubricants.

The present invention addresses these needs of the refrigeration industry by providing polymeric oil-return agents which create a solution or stabilized dispersion of lubricant oil (dispersed phase) in a HFC- and/or HCFC-based refrigerant (continuous phase), permitting improved lubricant oil transport through a refrigeration system and lubricant oil return back to the refrigeration system compressor from other refrigeration system zones.

SUMMARY OF THE INVENTION

The present invention relates to refrigerant compositions comprising: (a) a halogenated hydrocarbon containing at least one carbon atom and one fluorine atom; (b) an oil selected from the group consisting of mineral oils and synthetic oils; and (c) an effective amount of polymeric oil-return agent, wherein said oil-return agent forms a solution or stabilized dispersion of said halogenated hydrocarbon and said oil, and wherein said oil-return agent comprises less than about 10 weight percent of said refrigerant composition. The polymeric oil-return agents of the present invention solubilize or disperse mineral and synthetic oil lubricants with halogenated hydrocarbon refrigerants. The polymeric oil-return agents, as a small proportion of an overall refrigerant composition, permit efficient return of mineral and synthetic oil lubricants from non-compressor zones back to a compressor zone in a refrigeration system.

DETAILED DESCRIPTION

The present invention relates to refrigerant compositions comprising:

(a) a halogenated hydrocarbon containing at least one carbon atom and one fluorine atom;

(b) an oil selected from the group consisting of mineral oils and synthetic oils; and (c) an effective amount of polymeric oil-return agent, wherein said oil-return agent forms a solution or stabilized dispersion of said halogenated hydrocarbon and said oil, and wherein said oil-return agent comprises less than about 10 weight percent of said refrigerant composition.

The present invention further relates to compositions, comprising:

(a) a halogenated hydrocarbon containing at least one carbon atom and one fluorine atom; and (b) an effective amount of polymeric oil-return agent, wherein said oil-return agent forms a solution or a stabilized dispersion of said halogenated hydrocarbon with an oil comprising mineral oils and synthetic oils.

The present invention further relates to lubricant compositions for use with halogenated hydrocarbon refrigerant, comprising:

(a) an oil selected from the group consisting of mineral oils and synthetic oils; and (b) an effective amount of polymeric oil-return agent, wherein said oil-return agent forms a solution or stabilized dispersion of said oil with a halogenated hydrocarbon refrigerant.

Halogenated hydrocarbons of the present invention contain at least one carbon atom and one fluorine atom. Of particular utility are halogenated hydrocarbons having 1–6 carbon atoms containing at least one fluorine atom, optionally containing chlorine and oxygen atoms, and having a normal boiling point of from −90° C. to 80° C. By normal boiling point is meant the temperature at which a liquid composition's vapor pressure is equal to one atmosphere. These halogenated hydrocarbons may be represented by the general formula $C_wF_{2w+2-x-y}H_xCl_yO_z$, wherein w is 1–6, x is 1–9, y is 0–3, and z is 0–2. Preferred of the halogenated hydrocarbons are those in which w is 1–6, x is 1–5, y is 0–1, and z is 0–1. Such halogenated hydrocarbons are commercial products available from a number of sources such as E. I. du Pont de Nemours & Co., Fluoroproducts, Wilmington, Del., 19898, USA, or are available from custom synthesis companies such as PCR Inc., P.O. Box 1466, Gainesville, Fla., 32602, USA, and additionally by synthetic processes disclosed in art such as The Journal of Fluorine Chemistry, or Chemistry of Organic Fluorine Compounds, edited by Milos Hudlicky, published by The MacMillan Company, New York, N.Y., 1962. Examples are: $CCl_2F_2$ (CFC-12), $CHCl_2F$ (HCFC-21), $CHClF_2$ (HCFC-22), $CHF_3$ (HFC-23), $CH_2ClF$ (HCFC-31), $CH_2F_2$ (HFC-32), $CH_3F$ (HFC-41), $CHCl_2CF3$ (HCFC-123), $CHClFCClF_2$ (HCFC-123a), $CHClFCF_3$ (HCFC-124), $CHF_2CClF_2$ (HCFC-124a), $CHF_2CF_3$ (HFC-125), $CH_2ClCF_3$ (HCFC-133a), $CHF_2CHF_2$ (HFC-134), $CH_2FCF_3$ (HFC-134a), $CClF_2CH_3$ (HCFC-142b), $CHF_2CH_2F$ (HFC-143), $CF_3CH_3$ (HFC-143a), $CHClFCH_3$ (HCFC-151a), $CHF_2CH_3$ (HFC-152a), $CHF_2CCl_2CF_3$ (HCFC-225aa), $CHClFCClFCF_3$ (HCFC-225ba), $CHF_2CClFCClF_2$ (HCFC-225bb), $CHCl_2CF_2CF_3$ (HCFC-225ca), $CHClFCF_2CClF_2$ (HCFC-225cb), $CHF_2CF_2CCl_2F$ (HCFC-225cc), $CClF_2CHClCF_3$ (HCFC-225da), $CClF_2CHFCClF_2$ (HCFC-225ea), $CF_3CHFCCl_2F$ (HCFC-225eb), $CHF_2CClFCF_3$ (HCFC-226ba), $CHClFCF_2CF_3$ (HCFC-226ca), $CHF_2CF_2CClF_2$ (HCFC-226cb), $CF_3CHClCF_3$ (HCFC-226da), $CClF_2CHFCF_3$ (HCFC-226ea), $CHF_2CF_2CF_3$ (HFC-227ca), $CF_3CFHCF_3$ (HFC-227ea), $CHF_2CClFCHF_2$ (HCFC-235ba), $CH_2FCClFCF_3$ (HCFC-235bb), $CHClFCF_2CHF_2$ (HCFC-235ca), $CH_2ClCF_2CF_3$ (HCFC-235cb), $CH_2FCF_2CClF_2$ (HCFC-235cc), $CHF_2CHClCF_3$ (HCFC-235da), $CHClFCHFCF_3$ (HCFC-235ea), $CHF_2CHFCClF_2$ (HCFC-235eb), $CClF_2CH_2CF_3$ (HCFC-235fa), $CHFCF_2CHF_2$ (HFC-236ca), $CH_2FCF_2CF_3$ (HFC-236cb), $ClF_2CHFCF_3$ (HFC-236ea), $CF_3CH_2CF_3$ (HFC-236fa), $CH_2FCF_2CHF_2$ (HFC-245ca), $CH_3CF_2CF_3$ (HFC-245cb), $CHF_2CHFCHF_2$ (HFC-245ea), $CH_2FCHFCF_3$ (HFC-245eb), $CHF_2CH_2CF_3$ (HFC-245fa), $CH_2FCF_2CH_2F$ (HFC-254ca), $CH_2CF_2CHF_2$ (HFC254cb), $CH_2FCHFCHF_2$ (C-254ea), $CH_3CHFCF_3$ (HFC-254eb), $CHF_2CH_2CHF_2$ (BFC-254fa), $CH_2FCH_2CF_3$ (HFC-254fb), $CH_3CF_2CH_3$ (HFC272ca), $CH_3CHFCH_2F$ (HFC-272ea), $CH_2FCH_2CH_2F$ (HFC-272fa), $CH_3CH_2CF_2H$ (HFC-272fb), $CH_3CHFCH_3$ (HFC-28lea), $CH_3CH_2CH_2F$ (HFC-281fa), $CF_3CF_2CF_2CF_2H$ (HFC-329p), $CF_3CF_2CFHCF_3$ (HFC-329me), $CF_3CF_2CF_2CFH_2$ (HFC-338q), $CF_3CF_2CH_2CF_3$ (HFC-338mf), $CF_3CF_2CFHCF_2H$ (HFC-338pe), $CF_3CFHCF_2CF2H$ (HFC-338pce), $CHF_2CF_2CF_2CF_2H$ (HFC-338pcc), $CF_3CFHCFHCF_3$ (HFC-338mee), $CF_3CF_2CF_2CF_2CF_2H$ (HFC-42-11p), $CF_3CF_2CFHCF_2CF_3$ (H4FC-42-1 lmce), $CF_3CF_2CF_2CFHCF_3$ (HFC-42-11me), $CF_3CF_2CH_2CF_2CF_3$ (IHFC-43-10mcf), $CF_3CF_2CF_2CH_2CF_3$ (HFC43-10mf), $CF_3CF_2CF_2CF_2CFH_2$ (BFC-43-10q), $CF_3CF_2CF_2CFHCF_2H$ (HFC43-10pe), $CF_3CF_2CFHCF_2CF_2H$ (HFC-43-10pce), $CF_3CBFCHFCF_2CF_3$ (HFC-43-10mee), $CF_2HCF_2CF_2CF_2CF_2H$ (HFC43-10pccc), $CF_3CFHCF_2CF_2CF_2H$ (HFC-43-10pcce), $CF_3CFHCF_2CFHCF_3$ (HFC43-10mece), $CF_3CF_2CF_2CF_2CF_2CF_2H$ (HFC52-13p), $C_4F_9OCH_3$, and $C_4F_9OC2H_5$. Preferred of the halogenated hydrocarbons are: $CHClF_2$ (HCFC-22), $CHF_3$ (HFC-23), $CH_2F_2$ (HFC-32), $CHClFCF_3$ (HCFC-124), $CHF_2CF_3$ (HFC-125), $CHF_2CHF_2$ (HFC-134), $CH2FCF_3$ (HFC-134a), $CF_3CH_3$ (HFC-143a), $CHF_2CH_3$ (HFC-152a), $CHF_2CF_2CF_3$ (HFC-227ca), $CF_3CFHCF_3$ (HFC-227ea), $CF_3CH_2CF_3$ (HFC-236fa), $CHF_2CH_2CF_3$ (HFC-245fa), $CHF_2CF_2CF_2CF_2H$ (HFC-338pcc), $CF_3CHFCHFCF_2CF_3$ (HFC-43-10mee), and azeotropic and azeotrope-like halogenated hydrocarbon compositions such as: HCFC-22/HFC-152a/HCFC-124 (R-401A, R401B, R-401C), HFC-125/HFC143a/HFC-134a (R404A), HFC-32/HFC-125/HFC-134a (R-407A, R-407B, R-407C), HCFC-22/HFC-143a/HFC-125 (R-408A), HCFC-22/HCFC-124/14CFC142b (R-409A), HFC-32/HFC-125 (R410A), and HFC-125/HFC-143a (R-507).

The halogenated hydrocarbons of the present invention may further comprise up to 10 weight percent of at least one $C_3$ to $C_5$ hydrocarbon, e.g., propane, propylene, cyclopropane, n-butane, i-butane, and n-pentane. Examples of halogenated hydrocarbons containing such $C_3$ to $C_5$ hydrocarbons are azeotrope-like compositions of HCFC-22/HFC-125/propane (R-402A, R402B) and HCFC-22/octafluoropropane/propane (R403A, R403B).

Oils of the present invention are oils conventionally employed as lubricants in refrigeration apparatus with CFC-based refrigerants. Such oils and their properties are discussed in the 1990 ASHRAE Handbook, Refrigeration Systems and Applications, chapter 8, titled "Lubricants in Refrigeration Systems", pages 8.1–8.21. Oils of the present invention comprise the family of compounds commonly known in this field as mineral oils. Mineral oils comprise paraffins (straight-chain and branched-carbon-chain, saturated hydrocarbons), naphthenes (cycloparaffns), aromatics (unsaturated, cyclic hydrocarbons containing one or more rings characterized by alternating double bonds), and non-hydrocarbons (molecules containing atoms such as sulfur, nitrogen, or oxygen in addition to carbon and hydrogen). Oils of the present invention further comprise the family of compounds commonly known in this field as synthetic oils. Synthetic oils comprise alkylaryls (such as linear and branched-alkyl-chain alkylbenzenes), synthetic paraffins, and polyalphaolefins. Examples of commercially available lubricant oils of the present invention are Suniso® 30S, Sontex® 372LT, and Calumet® RO-30 (all previous three being naphthenes), Zerol® 150 (an alkylbenzene), and "BVM 100 N" (a paraffin).

Polymeric oil-return agent of the present invention has a number-average molecular weight ($M_n$) of at least about 3,000. In a preferred embodiment, the polymeric oil-return agent has a number-average molecular weight of at least about 6,000. In a more preferred embodiment, the polymeric oil-return agent has a number-average molecular weight of from about 10,000 up to in excess of 40,000, and in cases, in excess of 100,000. The polydispersity ($M_w/M_n$, wherein $Ml_w$ is the weight-average molecular weight) of the polymeric oil-return agent of the present invention is not critical, and is typically between 1 and 5 for polymeric oil-return agents of good utility.

Polymeric oil-return agent of the present invention may be free of fluorine. In a preferred embodiment of the present invention, the polmeric oil-return agent contains fluorine. In a preferred embodiment of the present invention wherein the polymeric oil-return agent is a random copolymer of fluorinated and non-fluorinated acrylates, the amount of fluorine the polymeric oil-return agent contains is greater than zero and less than 50 weight %, preferably at least about 10 weight % fluorine and more preferably about 25 weight percent fluorine.

Polymeric oil-return agent of the present invention includes polymers comprising repeating units of at least one monomer represented by the formulae $CH_2=C(R^1)CO_2R^2$, $CH_2=C(R^3)C_6H_4R^4$, and $CH_2=C(R^5)C_6H_4XR^6$, wherein X is oxygen or sulfur, $R^1$, $R^3$, and $R^5$ are independently selected from the group consisting of H and $C_1$–$C_4$ alkyl radicals, and $R^2$, $R^4$, and $R^6$ are independently selected from the group consisting of carbon-chain-based radicals containing C, and F, and may further contain H, Cl, ether oxygen, or sulfur in the form of thioether, sulfoxide, or sulfone groups. Representative such radicals are alkyl, alkoxyalkyl, fluoroalkyl, fluoroalkoxyalkyl, alkylphenyl, alkoxyalkyl phenyl, fluoroalkylphenyl, fluoroalkoxyalkylphenyl, and fluoroalkoxyfluoroalkylphenyl radicals. $R^2$ may not be perfluorinated, as such structures are known to be unstable.

Representative alkyl radicals are those identified by the formula —$C_aH_{(2a+1)}$, wherein a is 1–20.

Representative alkoxyalkyl radicals are those identified by the formulae $—(CH_2O)_bR^7$ and $—(CHR^8CHR^9O)_cR^{10}$, wherein b and c are independently selected from 1–20 and $R^7$–$R^{10}$ are independently selected from H and alkyl radicals represented by the formula $—C_dH_{(2d+1)}$, wherein d is 1–20.

Representative fluoroalkyl radicals are those identified by the formula $—C_eF_{(2e+1+f)}H_f$, wherein e is 1–20 and f is 0 to 2e.

Representative fluoroalkoxyalkyl radicals are those identified by the formulae $—(CH_2O)_gR^{11}$ and $—(CHR^{12}CHR^{13}O)_hR^{14}$, wherein g and h are independently selected from 1–20, $R^{12}$ and $R^{13}$ are independently selected from alkyl radicals represented by the formula $—C_iH_{(2i+1)}$, wherein i is 1–5, and $R^{11}$ and $R^4$ are independently selected from fluoroalkyl radicals represented by the formula $—C_kF_{(2k+1-m)}H_m$, wherein k is 1–20 and m is 0 to 2k.

Representative fluoroalkoxyfluoroalxyl radicals are those identified by the formulae $—(CR^{15}R^{16}O)_nR^{17}$ and $—(CR^{18}R^{19}CR^{20}R^{21}O)_pR^{22}$, wherein n and p are independently selected from 1–20, $R^{15}$, $R^{15}$, $R^{18}$, $R^{19}$, $R^{20}$, and $R^{21}$ are independently selected from H, F, and fluoroalxyl radicals represented by the formula $—C_qF_{(2q+1-r)}H_r$, wherein q is 1–20 and r is 0 to 2q, and $R^{17}$ and $R^{22}$ are independently selected from fluoroalxyl radicals represented by the formula $—C_sF_{(2s+1-t)}H_t$, wherein s is 1–20 and t is 0to2s.

Representative alkylphenyl radicals are those identified by the formulae $—C_6H_4C_uH_{(2u+1)}$ and $—C_6H_4OC_uH_{(2u+1)}$ wherein u is 1–20.

Representative alkoxyalkylphenyl radicals are those identified by the formulae $—C_6H_4R^{23}$ and $—C_6H_4OR^{23}$, wherein $R^{23}$ is selected from the formulae $—(CH_2O)_vR^{24}$ and $—(CHR^{25}CHR^{26}O)_wR^{27}$, wherein v and w are independently selected from 1–20 and $R^{24}$–$R^{27}$ are independently selected from H and alkyl radicals selected from the group represented by the formula $—C_xH_{(2x+1)}$, wherein x is 1–20.

Representative fluoroalkylphenyl radicals are those identified by the formulae $—C_6H_4C_yF_{(2y+1-z)}H_z$ and $—C_6H_4OC_yF_{(2y+1-z)}H_z$, wherein y is 1–20 and z is 0 to 2y.

Representative fluoroalkoxyalkylphenyl radicals are those identified by the formulae $—C_6H_4R^{28}$ and $—C_6H_4OR^{28}$, wherein $R^{28}$ is selected from the formulae $—(CH_2O)_{a'}R^{29}$ and $—(CHR^{30}CHR^{31}O)_{b'}R^{32}$, wherein a' and b' are independently selected from 1–20, $R^{30}$ and $R^{31}$ are independently selected from alkyl radicals represented by the formula $—C_{c'}H_{(2c'+1)}$, wherein c' is 1–5, and $R^{29}$ and $R^{32}$ are independently selected from fluoroalkyl radicals represented by the formula $—C_{d'}F_{(2d'+1-e')}H_{e'}$, wherein d' is 1–20 and e' is 0 to 2d'.32 e'

Representative fluoroalkoxyfluoroalkylphenyl radicals are those identified by the formulae $—C_6H_4R^{33}$ and $—C_6H_4OR^{33}$, wherein $R^{33}$ is selected from the formulae $—(CR^{34}R^{35}O)_{f'}R^{36}$ and $—(CR^{37}R^{38}CR^{39}R^{40}O)_{g'}R^{41}$, wherein f' and g' are independently selected from 1–20, $R^{34}$, $R^{35}$, $R^{37}$, $R^{38}$, $R^{39}$, and $R^{40}$ are independently selected from H, F, and fluoroalkyl radicals represented by the formula $—C_hF_{(2h'+1-i')}H_{i'}$, wherein h' is 1–5 and i' is 0 to 2h', and $R^{36}$ and $R^{41}$ are independently selected from fluoroalkyl radicals represented by the formula $—C_jF_{(2j'+1-k')}H_{k'}$, wherein j' is 1–20 and k' is 0to 2j'.

$R^6$ may comprise fluoroalkenyl groups comprising C and F and containing unsaturation, available from oligomers of fluoroolefins such as tetrafluoroethylene and hexafluoropropylene. For example, the polymeric oil-return agent of the present invention includes polymers comprising repeating units of monomer represented by the formulae $CH_2=C(R^5)C_6H_4XR^6$, wherein X is oxygen, $R^5$ is as previously defined, and $R^6$ is the group $—C(CF_3)=C(CF(CF_3)_2)_2$, such group arising from the readily available trimer of hexafluoropropylene $(CF(CF_3)=C(CF(CF_3)_2)_2)$.

Preferred polymeric oil-return agents of the present invention are those selected from the group represented by polymers comprising repeating units of at least one monomer represented by the formula $CH_2=C(R^1)CO_2R^2$, wherein $R^1$ is selected from H, $C_1$, and $C_2$ aLkyl radicals, and $R^2$ is selected from $C_1$ through $C_{-20}$ alkyl radicals and $—CH_2CH_2C_{k'}F_{(2k'+1)}$, wherein k' is from 2 to 12. Such a polymeric oil-return agent of the present invention is known as Zonyl® PHS sold by E. I. du Pont de Nemours & Co., Wilmington, Del., 19898, USA and is a random copolymer made by polymerizg 40 weight % $CH_2=C(CH_3)CO_2CH_2CH_2(CF_2CF_2)_mF$ (also referred to herein as Zonyl® fluoromethacrylate or ZFM) wherein m' is from 1 to 12, primarily 2 to 8, and 60 weight % lauryl methacrylate $(CH_2=C(CH_3)CO_2(CH_2)_{11}CH_3$, also referred to herein as LMA).

The polymeric oil-return agents of the present invention are employed in an effective amount in the present inventive compositions such that a solution or a stabilized dispersion of halogenated hydrocarbon and lubricating oil is formed. By "stabilized dispersion" is meant that a dispersion of halogenated hydrocarbon and oil is formed such that oil is returned with halogenated hydrocarbon from non-compressor zones to a compressor zone in a refrigeration system in a quantity which maintains acceptable compressor lubrication and thus overall refrigeration system operation. In the present inventive compositions comprising halogenated hydrocarbon containing at least one carbon atom and one fluorine atom, oil selected from the group consisting of mineral oils and synthetic oils, and polymeric oil-return agent, less than about 10 weight percent of the composition is polymeric oil-return agent. This is an effective amount of polymeric oil-return agent in the present compositions which results in a solution or stabilized dispersion of said halogenated hydrocarbon and said oil and adequate return of oil in a compression refrigeration system from non-compressor to compressor zones.

Hydrocarbon oil-return-agent carrier is an optional component of the present inventive compositions and comprises aliphatic hydrocarbon having at least 6 carbon atoms. For example, hexanes heptanes, octane, kerosene, and mixtures thereof, and in particular refined kerosene with a sulfur content less than 0.2 weight %. A preferred such commercially available compound is Isopar® H (a high purity iso-parafinic with low aromatics sold by Exxon Chemical). Hydrocarbon oil-return-agent carrier used together with the present polymeric oil-return agents results in excellent return of oil in a compression refrigeration system from non-compressor to compressor zones. Hydrocarbon oil-return-agent carrier assists in handling of the preferred acrylate-based polymeric oil-return agents (viscous and tacky materials under standard conditions) in that solutions of acrylate-based polymeric oil-return agent may be formed in hydrocarbon oil-return-agent carrier. Hydrocarbon oil-return-agent carrier may be used as the polymerization solvent in preparation of the acrylate-based polymeric oil-return agents, and thus may beneficially introduced at this point.

Antifoam agent is an optional component of the present inventive compositions. Antifoam agent can be used to control foaming in a refrigerating or air conditioning system. Antifoam agents useful in the present invention include, but are not limited to, polydimethylsiloxane (Dow 200), vinyl terminated polydimethylsiloxane (Gelest DMS-V3 1, DMS- V52), trimethyl terminated trilfluoropropyl methylsiloxane (Dow FS-1265), phenyl methyl siloxane (Gelest PMP-5053), and vinyl terminated trifluoropropyl methylsiloxanedimethylsiloxane copolymer (Gelest FMV4031).

The present compositions comprising halogenated hydrocarbon, oil, oil-return agent, and optionally, an oil-return-agent carrier, generally comprise 40–99 weight % halogenated hydrocarbon, 1–60 weight % oil, 0.001–10 weight % oil-return agent, and 0–20 weight % oil-return-agent carrier, based on the total composition weight. More preferably, such compositions comprise 50–90 weight % halogenated hydrocarbon, 10–50 weight % oil, 0.005–5 weight % oil-return agent, and 0–10 weight % oil-return-agent carrier.

The further present compositions comprising: halogenated hydrocarbon, oil-return agent, and optionally, an oil-return-agent carrier; and oil, oil-return agent, and optionally, an oil-return-agent carrier, comprise weight ratios of components identical with those found in the present compositions comprising halogenated hydrocarbon, oil, oil-return agent, and optionally, an oil-return-agent carrier. That is to say, in the present compositions, the weight ratio of halogenated hydrocarbon to oil is from about 0.6 (40/60) to about 99 (99/1), the weight ratio of oil to oil-return agent is from about 0.1 (1/10) to about 60,000 (60/0.001), and the weight ratio of oil-return-agent carrier to oil-return agent is from about 20,000 (20/0.001) to a composition containing no oil-return-agent carrier.

The present invention further comprises processes for producing refrigeration comprising evaporating the present refrigeration compositions in the vicinity of a body to be cooled and processes for producing heat comprising condensing the present refrigeration compositions in the vicinity of a body to be heated.

The present invention further relates to processes for dispersing a halogenated hydrocarbon in an oil comprising contacting the halogenated hydrocarbon with the oil in the presence of an effective amount of polymeric oil-return agent which forms a solution or a stabilized dispersion of the halogenated halocarbon and the oil, wherein the halogenated hydrocarbon contains at least one carbon atom and one fluorine atom, and the oil is selected from the group consisting of mineral oils and synthetic oils.

The present invention further relates to processes for returning oil from a non-compressor zone to a compressor zone in a refrigeration system comprising:

(a) contacting the oil in the non-compressor zone with at least one halogenated hydrocarbon in the presence of an effective amount of polymeric oil-return agent to form a solution or a stabilized dispersion comprising halogenated halocarbon and oil, and (b) transferring the oil as the solution or stabilized dispersion from the non-compressor zone to the compressor zone of the refrigeration system, wherein the halogenated hydrocarbon contains at least on carbon atom and one fluorine atom, and the oil is selected from the group consisting of mineral oils and synthetic oils.

The present invention further relates to processes for transferring a oil from a low pressure zone to a compressor zone in a refrigeration system, comprising (a) contacting the oil in the low pressure zone of the refrigeration system with at least one halogenated hydrocarbon in the presence of an effective amount of polymeric oil-return agent to form a solution or a stabilized dispersion comprising the halogenated halocarbon and oil, and (b) transferring the oil as the solution or stabilized dispersion from the low pressure zone to the compressor zone of the refrigeration system, wherein the halogenated hydrocarbon contains at least one carbon atom atom one fluorine atom, and the oil is selected from the group consisting of mineral oils and synthetic oils.

The present compositions comprising halogenated hydrocarbon and polymeric oil-return agent also find utility as cleaning agents to remove hydrocarbon oils and soldering fluxes from solid surfaces. Halogenated hydrocarbons, particularly hydrofluorocarbons such as $CF_3CHFCHFCF_2CF_3$ (HFC-43-10mee), have limited oil solubility. Addition of polymeric oil-return agent to such halogenated hydrocarbons enhances the ability of halogenated hydrocarbon, particularly hydrofluorocarbon, to at least partially dissolve and thus remove oil and soldering fluxes from surfaces.

Thus, the present invention is further related to processes for vapor phase degreasing and solvent cleaning using the present compositions comprising halogenated hydrocarbon and polymeric oil-return agent. Such vapor degreasing processes comprise contacting a substrate to be cleaned, e.g., residue contaminated, silicon-metal composite electronic circuit boards, metal (e.g. stainless steel) fabricated parts and the like, with the present halogenated halocarbon/oil-return compositions in a liquid phase, and further, the halogenated hydrocarbon vapors resulting from boiling such compositions. Halogenated hydrocarbon vapors condensing on the substrate provide clean distilled halogenated hydrocarbon which further rinses away remaining oil-return agent and flux or other residue. Evaporation of halogenated hydrocarbon from the substrate leaves behind no residue. The present solvent cleaning processes comprise contacting a substrate to be cleaned with liquid phase present composition comprising polymeric oil-return agent and then removal of the substrate from the composition. For difficult to remove soils and oils where elevated temperature is necessary to improve the cleaning action of the solvent, or for large volume assembly line operations where the cleaning of substrates must be done efficiently and quickly, the conventional operation of a vapor degreaser consists of immersing the part to be cleaned in a sump of boiling solvent which removes the bulk of the soil, thereafter immersing the part in a sump containing freshly distilled solvent near room temperature, and finally exposing the part to solvent vapors over the boiling sump which condense on the cleaned part. In addition, the part can also be sprayed with distilled solvent before final rinsing. Vapor degreasers suitable in the above-described processes are well known in the art. For example, Sherliker et al. in U.S. Pat. No. 3,085,918, disclose such suitable vapor degreasers comprising a boiling sump, a clean sump, a water separator, and other ancillary equipment.

The present compositions comprising halogenated hydrocarbon and polymeric oil-return agent are effective in removing hydrocarbon oil and soldering flux residues from a broad range of substrates including metals, such as tungsten, copper, gold, beryllium, stainless steel, aluminum alloys, brass and the like; from glasses and ceramic surfaces, such as glass, sapphire, borosilicate glass, alumina, silica such as silicon wafers used in electronic circuits, fired alumina and the like; and from plastics such as polyolefin ("Alathon", Rynite®, "Tenite"), polyvinylchloride, polystyrene ("Styron"), polytetrafluoroethylene (Teflon®), tetrafluoroethylene-ethylene copolymers (Tefzel®), polyvinylidenefluoride ("Kynar"), ionomers (Surlyn®), acrylonitrile-butadiene-styrene polymers (Kralac®), phenol-formaldehyde copolymers, cellulosic ("Ethocel"), epoxy resins, polyacetal (Delrin®), poly(p-phenylene oxide) (Noryl®), polyetherketone ("Ultrapek"), polyetheretherketone ("Victrex"), poly(butylene terephthalate) ("Valox"), polyarylate (Arylon®), liquid crystal polymer, polyimide (Vespel®), polyetherimides ("Ultem"), polyamideimides ("Torlon"), poly(p-phenylene sulfide) ("Rython"), polysulfone ("Udel"), and polyaryl sulfone ("Rydel").

EXAMPLES

In the following examples, percentages (%) shown without a label refer to the weight percent of a given material in the total composition being discussed. Unless otherwise specified, Zonyl® PHS in the Examples refers to a random copolymer made from 40 wt % ZFM (Zonyl® fluoromethacrylate: $CH_2=C(CH_3)CO_2CH_2CH_2(CF_2CF_2)_{m'}F$, wherein m' is from 1 to 12, primarily 2 to 8) and 60 wt % LMA (lauryl methacrylate: $CH_2=C(CH_3)CO_2(CH_2)_{11}CH_3$). The error in the oil return measurements reported is ±0.5 wt %.

EXAMPLE 1

Suitable containers were filled with mixtures containing 80 wt % HFC-134a, 20 wt % Zerol® 150 alkyl benzene oil, with and without 0.08 wt % Zonyl® PHS oil-return agent and 0.32 wt % kerosene carrier. The mixtures were shaken for 10 minutes then placed in a sonicator bath for 30 minutes at room temperature. After removing from the bath the time was recorded to visually observe the refrigerant layer and oil layer become completely separated, visually clear phases to the naked eye. Results are recorded in Table 1.

TABLE 1

|  | Oil Layer-Time to Clear | Refrigerant Layer-Time to Clear |
| --- | --- | --- |
| HFC-134a/Zerol® (80/20%) | 1 hr 50 min | 17 min |
| HFC-134a/Zerol®/ Zonyl® PHS/kerosene (80/19.6/0.08/0.32%) | >24 hr | >24 hr |

Results show addition of Zonyl® PHS significantly improves dispersability between HFC-134a and alkyl benzene.

EXAMPLE 2

Suitable containers were filled with mixtures containing 95 wt % 1,1,1,2,3,4,4,5,5,5-decafluoropentane (HFC-43-10mee) and 4.9 wt % Suniso® 3GS mineral oil, with and without 0.02 wt % Zonyl® PHS oil-return agent and 0.08 wt % kerosene oil-retun-agent carrier. The mixtures were shaken for 10 minutes then placed in a sonicator bath for 30 minutes at room temperature. After removing from the bath, the time was recorded for the refrigerant layer and oil layer to become completely separated, visually clear phases to the naked eye. Results are recorded in Table 2.

TABLE 2

|  | Oil Layer-Time to Clear | Refrigerant Layer-Time to Clear |
| --- | --- | --- |
| HFC-43-10mee/3GS (95/5%) | >18 hr | 43 min |
| HFC-43-10mee/3GS/ Zonyl® PHS/kerosene (95/4.9/0.02/0.08 wt %) | >24 hr | 53 min |

Results show addition of Zonyl® PHS improves dispersability between HFC-43-10mee and mineral oil.

EXAMPLE 3

A miscibility test was conducted to determine if a one phase mixture could be achieved for a normally immiscible refrigerant/oil pair by addition of Zonyl® additives. A suitable container was filled with 1.2 grams HFC-134a, 0.8 g Suniso® 3GS mineral oil, and 0.02 grams of Zonyl® PHS (comprising 80 wt % kerosene and 20 wt % Zonyl® PHS), Zonyl® FSA (23–25 wt % $F(CF_2CF_2)_{3-8}CH_2CH_2SCH_2CH_2CO_2Li$, 35–40 wt % water, 35–40 wt % isopropanol), or Zonyl® FSN (40 wt % $F(CF_2CF_2)_{3-8}(CH_2CH_2O)_{3-10}H$, 40 wt % water, 40 wt % isopropanol). Mixtures were visually observed by the naked eye initially for miscibility by observing the number of phases and clarity (clear or cloudy). Mixtures were then exposed for 5 minutes to ultrasonification at room temperature, observed, then allowed to sit for 5 minutes and observed again. Results are shown in Table 3.

TABLE 3

|  | Initial | Sonification then 5 min Rest | Molecular Weight |
| --- | --- | --- | --- |
| HFC-134a/3GS plus: |  |  |  |
| Zonyl® FSA | Clear | Cloudy | ~500 |
| No. Phases | 2 | 2 |  |
| Zony® FSN | Cloudy | Cloudy | ~950 |
| No.Phases | 2 | 2 |  |
| Zonyl® PHS | Clear | Cloudy | 40,000 ($M_n$) |
| No. Phases | 2 | 1 |  |

The samples were then heated at 100° C. for one hour, ultrasonified for 30 minutes at 100° C., then observed at room temperature after 5 minutes, one hour and 24 hours. Only the sample with the Zonyl® PHS oil-return agent showed a stable dispersion to form and be maintained from the 2 phases.

The data show Zonyl® PHS has improved dispersability versus lower molecular weight Zonyl® FSA and Zonyl® FSN. The Zonyl® PHS mixture was able to achieve a stable dispersion of the 2 phases over a long period of time, indicating that the miscibility between refrigerant and lubricant oil was improved.

EXAMPLE 4

A miscibility test was conducted to determine if a single-phase mixture could be achieved for a normally immiscible refrigerant/oil pair by addition of Zonyl® PHS oil-return agent. A test tube was filled with 7.5 grams of refrigerant HFC43-10mee and 2.5 grams HAB 22 oil (HAB 22 is a branched alkylbenzene oil sold by Nippon Oil). A 48 wt % Zonyl® PHS/52 wt % Isopar H oil-return-agent carrier (Isopar® H is a high purity iso-parafinic with low aromatics sold by Exxon Chemical) mixture was added in 0.5 grain increments to the HFC-43-10mee/IAB 22 mixture. After each addition, the tube was shaken for 1 minute, then allowed to stand for 2 minutes at room temperature. Subsequently, refrigerant and oil phases were visually observed by the naked eye for cloudiness and change in level of refrigerant/oil interface. Due to density differences between refrigerant and oil, oil comprised the top layer. A similar test was also conducted for Surfynol® SE (2,4,7,9-tetramethyl-5-decyne4,7-diol sold by Air Products). Results are shown in Table 4.

TABLE 4

| Quantity of Additive Added to 10 g Refrigerant/Oil Mixture | Visual Observation using Zonyl ® PHS/Isopar ® H | Visual Observation Using Surfynol ® SE |
| --- | --- | --- |
| 0.5 grams | Oil layer-cloudy<br>Refrig. layer-light cloudy<br>Oil/refrig interface level-No change | Oil layer-light cloudy<br>Refrig. layer-cloudy<br>Oil/refrig interface level-No change |
| 1.0 grams | Oil layer-heavy cloudy<br>Refrig. layer-light cloudy<br>Oil/refrig interface level-No change | Oil layer-light cloudy<br>Refrig. layer-cloudy<br>Oil/refrig interface level-No change |
| 1.5 grams | Oil layer-heavy cloudy<br>Refrig. layer-light cloudy<br>Oil/refrig interface level-lower than original | Oil layer-light cloudy<br>Refrig. layer-cloudy<br>Oil/refrig interface No level-change |
| 2.0 grams | Single, heavy, cloudy solution | Oil layer-light cloudy<br>Refrig. layer-cloudy<br>Oil/refrig interface level-No change |
| 2.5 grams | Single, heavy, cloudy solution | Oil layer-light cloudy<br>Refrig. layer-cloudy<br>Oil/refrig interface level-No change |
| 3.5 to 10 grams | Single, heavy, cloudy Solution | Oil layer-cloudy<br>Refrig. layer cloudy<br>Oil/refrig interface level-slightly lower than original |

Results show a one phase mixture of a normally immiscible refrigerant/oil pair can be achieved by addition of Zonyl® PHS/Isopar H. One phase was not achieved with Surfynol® SE.

EXAMPLE 5

Oil return was tested in an oil-return apparatus as follows. Liquid refrigerant was fed from a pressurized cylinder through copper tubing to a heater where it was vaporized. The refrigerant vapor then passed through a pressure regulator and metering valve to control flow at a constant rate of 1,000–1,100 cc per minute and 1 atm pressure. The refrigerant vapor was fed to another copper tube 180 cm in length and 0.635 cm outer diameter formed into a U-shape placed in a constant temperature bath. The U-shaped tube (U-tube) began with a straight vertical section 37 cm long then bent to a horizontal section 27 cm long at the bottom of the bath. The tube then rose vertically in a zig-zag pattern with four 23 cm lengths, followed by another vertical straight section 23 cm long. The U-tube was filled with 10 grams of oil, optionally containing oil-return agent and oilreturn-agent carrier, which was added to the U-tube through the 37 cm vertical tube. Vapor refrigerant passed slowly through the oil in the U-tube. Refrigerant and oil exiting the U-tube was collected in a receiver and refrigerant allowed to evaporate. Oil was then weighed to determine how much was carried out of the U-tube by the refrigerant.

R401A refrigerant (53 weight % HCFC-22, 13 weight % HFC-152a and 34 weight % HCFC-124) was placed in the refrigerant cylinder. Suniso® 3GS mineral oil or oil and Zonyl® PHS, optionally with kerosene oil-return-agent carrier, was placed in the copper U-tube, wherein total oil and oil-return agent, and oil-return-agent carrier equaled 10 grams. The constant temperature bath was held at a temperature of −20° C. Refrigerant vapor was fed through the U-tube at a flow rate of 1,100 cubic centimeters per minute and weight of oil in the receiver measured at 6, 10, 20 and 30 minute time intervals. Data are shown in Table 5 below.

TABLE 5

| | Weight % of Oil Returned | | | |
| --- | --- | --- | --- | --- |
| Oil Composition in U-tube | 6 Min | 10 Min | 20 Min | 30 Min |
| 3GS | 0 | 7.9 | 18.0 | 28.4 |
| 0.1% Zonyl ® PHS in 3GS | 0 | 10.9 | 21.9 | 33.6 |
| 0.2% Zonyl ® PHS in 3GS | 0 | 10.3 | 24.0 | 34.4 |
| 0.4% Zonyl ® PHS/1.6% kerosene in 3GS | 6.8 | 18.4 | 38.7 | 50.9 |

The data show addition of Zonyl® PHS to mineral oil improves oil return and in particular, when kerosene is used as carrier.

EXAMPLE 6

The apparatus and procedure of Example 5, with exceptions discussed below, was used to test refrigerant R401A (53 wt % HCFC-22, 13 wt % HFC-152a and 34 weight % HCFC-124). Suniso® 3GS mineral oil, with and without additives, was compared to Zerol® 150. The constant temperature bath was held at 0° C. Results are shown in Table 6.

TABLE 6

| | Weight % Oil Returned | | | |
| --- | --- | --- | --- | --- |
| Oil Composition in U-tube | 5 min | 10 min | 20 min | 30 min |
| 3GS | 14.7 | 25.8 | 35.1 | 41.2 |
| Zerol ® 150 | 22.8 | 34.5 | 45.8 | 53.2 |
| 2% kerosene in 3GS | 18.4 | 29.4 | 39.5 | 44.8 |
| 0.4% Zonyl ® PHS in 3GS | 18.5 | 31.3 | 52.3 | 56.8 |
| 0.4% Zonyl ® PHS + 1.6% kerosene in 3GS | 23.3 | 41.5 | 56.5 | 61.5 |

Results show oil return is significantly improved versus Zerol® 150 with addition of Zonyl® PHS only or Zonyl® PHS/kerosene mixtures to mineral oil.

EXAMPLE 7

The apparatus and procedure of Example 5 was used to test refrigerant R401A (53 wt % HCFC-22, 13 wtOA HFC-152a and 34 weight % HCFC-124). Suniso® 3GS, with and without additives, was compared to Zerol® 150. Results are shown in Table 6.

TABLE 7

| | Weight % Oil Returned | | | |
| --- | --- | --- | --- | --- |
| Oil Composition in U-tube | 6 Min | 10 Min | 20 Min | 30 Min |
| 3GS | 0 | 1.1 | 14.5 | 26.2 |
| Zerol ® 150 | 1.1 | 14.1 | 31.0 | 40.0 |
| 0.4% Zonyl ® PHS in 3GS | 2.8 | 10.0 | 27.9 | 45.7 |
| 0.4% Zonyl ® PHS + 3% Isopar ® H in 3GS | 10.3 | 17.7 | 44.4 | 54.2 |
| 0.4% 100% LMA Homopolymer + 3% Isopar ® H in 3GS | 1.3 | 11.8 | 28.8 | 35.1 |

Results show oil return of mineral oil is significantly improved with addition of Zonyl®PHS, optionally with Isopar® H, or with 100% LMA/Isopar®H mixtures. In this refrigerant/oil system, fluorinated Zonyl®PHS copolymer with Isopar® H is preferred versus non-fluorinated LMA homopolymer because Zonyl®PHS/Isopar® H oil return exceeds Zerol® 150. Thus a retrofit from a CFC/mineral oil refrigerating system to an HCFC refrigerant could be performed without the usual practice of changing the oil to alkyl benzene.

EXAMPLE 8

The apparatus and procedure of Example 5 was used to evaluate different oil-return-agent carriers for Zonyl® PHS oil-return agent. The refrigerant was R401A (53 wt % HCFC-22, 13 wt % HFC-152a and 34 wt % HCFC-124). The oil tested was Suniso® 3GS mineral oil. Results are shown in Table 8.

TABLE 8

| Oil Composition in U-tube | Weight % Oil Returned | | | |
| --- | --- | --- | --- | --- |
|  | 6 Min | 10 Min | 20 Min | 30 Min |
| 3GS | 0.0 | 5.7 | 16.1 | 26.6 |
| 0.4% Zonyl® PHS/1.6% kerosene in 3GS | 6.9 | 17.4 | 32.9 | 44.2 |
| 0.4% Zonyl® PHS/1.6% pentane in 3GS | 9.7 | 20.8 | 38.7 | 48.5 |
| 0.4% Zonyl® PHS/1.6% octane in 3GS | 8.9 | 19.9 | 39.5 | 50.5 |

Results show kerosene, pentane and octane are all effective oil-return-agent carriers for Zonyl® PHS.

EXAMPLE 9

The apparatus and procedure of Example 5, with exceptions discussed below, was used to test refrigerant R410a (50 wt % HFC-32 and 50 wt % HFC-125). Polyol ester oil Mobil EAL Arctic-22CC) was used as a baseline to compare performance versus Zerol® 150 with oil-return agent added. The constant temperature bath was held at 0° C. Results are shown in Table 9.

TABLE 9

| Oil Composition in U-tube | Weight % Oil Returned | | |
| --- | --- | --- | --- |
|  | 6 Min | 10 Min | 20 Min |
| POE | 22.5 | 30.2 | 39.1 |
| 3% Isopar® H in Zerol® 150 | 22.3 | 27.6 | 34.5 |
| 0.4% Zonyl® PHS + 3% Isopar H in Zerol® 150 | 28.9 | 39.4 | 46.1 |

Results show oil return performance of R410a using Zerol® 150 containing 0.4% Zonyl® PHS +3% Isopar H is better than POE alone. Performance is also improved versus Isopar® H only in Zerol® 150.

EXAMPLE 10

The apparatus and procedure of Example 5, with exceptions discussed below, was used to test refrigerant R404A (44 wt % HFC-125, 52 wt % HFC-143a, and 4 wt % HFC-134a). The oil was HAB 22 (HAB 22 is a branched alkylbenzene oil sold by Nippon Oil). Various copolymers of fluorinated acrylate ZFM (Zonyl® fluoromethacrylate: $CH_2=C(CH_3)CO_2CH_2CH_2(CF_2CF_2)_{m'}F$, wherein m' is from 1 to 12, primarily 2 to 8) and lauryl methacrylate (LMA) were compared. These lo copolymers are shown in Table 10 in the form of, for example, "40/60 ZFM/LMA", which indicates a random copolymer synthesized from 40 wt % of ZFM and 60 wt % of LMA. The constant temperature bath was held at −20° C. and refrigerant vapor was passed through the U-tube for 20 minutes. The weight % of F (fluorine) in the polymers was measured by combustion analysis. Results are shown in Table 10.

TABLE 10

| Oil Composition in U-tube | Wt % F in Polymer | Wt % of Oil Returned | | |
| --- | --- | --- | --- | --- |
|  |  | 6 Min | 10 Min | 20 Min |
| POE | — | 1.0 | 10.6 | 18.9 |
| HAB 22 | — | 0 | 6.1 | 16.2 |
| 3% Isopar® H in HAB 22 | — | 0 | 9.6 | 19.2 |
| 0.4% 40/60 ZFM/LMA Zonyl® PHS in HAB 22 | 24.3 | 1.0 | 6.4 | 19.5 |
| 0.4% 40/60 ZFM/LMA Zonyl® PHS + 3% Isopar® H in HAB 22 | 24.3 | 5.7 | 12.4 | 23.3 |
| 1.0% 40/60 ZFM/LMA Zonyl® PHS + 3% Isopar® H in HAB 22 | 24.3 | 5.2 | 11.0 | 22.8 |
| 0.4% 50/50 ZFM/LMA Zonyl® PHS + 3% Isopar® H in HAB 22 | 29.4 | 5.1 | 12.1 | 20.8 |
| 0.4% 100% ZFM Homopolymer + 3% Isopar® H in HAB 22 | 63.4 | 2.7 | 10.1 | 17.0 |
| 0.4% 100% LMA Homopolymer + 3% Isopar® H in HAB 22 | 0 | 4.0 | 11.4 | 20.2 |

Results show oil return is significantly improved with addition of Zonyl® PHS/Isopar mixtures to hard alkylbenzene oil (HB 22). Zonyl® PHS concentrations from 0.4 to 1.0 wt % of the overall composition are effective as is a 50/50 copolymer of ZFM/LMA. 100% LMA and 100% ZFM homopolymers also showed some improvement in oil return, though 0.4% Zonyl® PHS (40/60 ZFM/LMA copolymer) +3 % Isopar® H is most effective.

EXAMPLE 11

The apparatus and procedure of Example 5 was used to test refrigerant R401A. The oil was Suniso®3GS mineral oil compared to a baseline of Zerol® 150 alkyl benzene. Various copolymers of fluorinated acrylate ZFM (Zonyl® fluoromethacrylate: $CH_2=C(CH_3)CO_2CH_2CH_2(CF_2CF_2)_{m'}F$, wherein m' is from 1 to 12, primarily 2 to 8), lauryl methacrylate (LMA), or stearyl methacrylate (SM) were compared. These copolymers are shown in Table 11 in the form of, for example, "40/60 ZFM/LMA", which indicates a random copolymer synthesized from 40 wt % of ZFM and 60 wt % of LMA. The weight % of F (fluorine) in the polymers was measured by combustion analysis. Results are shown in Table 11.

TABLE 11

| Oil Composition in U-tube: | Polymer $M_n$ | Polymer $M_w$ | Wt % F in Polymer | Weight % of Oil Returned | | |
| --- | --- | --- | --- | --- | --- | --- |
|  |  |  |  | 6 Min | 10 Min | 20 Min |
| 3GS | — | — | — | 0 | 1.1 | 14.5 |
| Zerol® 150 | — | — | — | 0.6 | 13.9 | 31.9 |
| 0.4% 20/80 ZFM/LMA Zonyl® PHS + 3% Isopar® H in 3GS | 44,800 | 180,000 | 11.7 | 6.3 | 18.1 | 33.6 |
| 0.4% 40/60 ZFM/LMA Zonyl® PHS + 3% Isopar® H in 3GS | 40,000 | 194,000 | 24.3 | 10.3 | 17.7 | 44.4 |
| 0.4% 50/50 ZFM/LMA Zonyl® PHS + 3% Isopar® H in 3GS | 30,700 | 128,000 | 29.4 | 0 | 13.3 | 39.9 |
| 0.4% 67/33 ZFM/SM + 3% Isopar® H | 15,000 | 50,400 | 39.7 | 0 | 8.8 | 31.3 |

Results show addition of 20/80, 40l60 and 50/50 wt % Zonyl® PHS/Isopar® H to mineral oil provides better oil return than alkylbenzene. Weight ratio 67/33 ZFMISM with Isopar® H also improves mineral oil return.

EXAMPLE 12

The apparatus and procedure of Example 5 was used to test refrigerant R401A. The oil was Suniso®3GS mineral oil compared to a baseline of Zerol® 150 alkyl benzene. Various copolymers of fluorinated acrylate ZFM and LMA 10 polymerized to different molecular weights were compared. These copolymers are shown in Table 12 in the form of, for example, "40/60 ZFM/LMA", which indicates a random copolymer synthesized from 40 wt % of ZFM and 60 wt % of LMA with moleculare weight differences also shown. The weight % of F (fluorine) in the polymers was measured by combustion analysis. Results are shown in Table 12.

TABLE 12

| Oil Composition in U-tube: | Polymer $M_n$ | Polymer $M_w$ | Wt % F in Polymer | Weight % of Oil Returned | | |
|---|---|---|---|---|---|---|
| | | | | 6 Min | 10 Min | 20 Min |
| 3GS | — | — | — | 0 | 1.2 | 19.7 |
| Zerol ® 150 | — | — | — | 0 | 9.6 | 31.2 |
| 3% Isopar ® H in 3GS | | | | 0.4 | 14.0 | 30.6 |
| 0.4% 40/60 ZFM/LMA Zonyl ® PHS + 3% Isopar ® H in 3GS | 40,000 | 194,000 | 24.3 | 0.5 | 20.1 | 40.9 |
| 0.4% 40/60 ZFM/LMA Zonyl ® PHS + 3% Isopar ® H in 3GS | 12,800 | 23,060 | 24.3 | 2.1 | 19.5 | 42.6 |
| 0.4% 40/60 ZFM/LMA Zonyl ® PHS + 3% Isopar ® H | 6,660 | 9,930 | 24.3 | 0.3 | 21.9 | 41.9 |

Results show 40/60 Zonyl® PHS polymerized with number average molecular weights varying from 6,660 to 40,000 have significantly improved oil return versus 3GS, Zerol® 150, and Isopar® H only in 3GS.

EXAMPLE 13

The apparatus and procedure of Example 5 was used to test refrigerant R401A with several oil return additives, Zonyl® PHS, Surfynol® SE, and the fluorinated polystyrene $CF_3(CF_2)_7(CH_2CHC_6H_5)_nCl$, wherein $M_n$ is 2,688 and the average n is about 21. Synthesis of this polymer is described in U.S. Pat. No. 5,773,538. The oil was Suniso® 3GS mineral oil compared to a baseline of Zerol ® 150 alkyl benzene oil. Results are shown in Table 13.

TABLE 13

| Oil Composition in U-tube | Weight % of Oil Returned | | |
|---|---|---|---|
| | 6 Min | 10 Min | 20 Min |
| 3GS | 0 | 0.8 | 12.7 |
| Zerol ® 150 | 0 | 8.9 | 26.3 |
| 3% Isopar ® H in 3GS | 0.3 | 10.6 | 25.4 |
| 0.4% Zonyl ® PHS + 3% Isopar ® H in 3GS | 5.9 | 14.3 | 37.7 |
| 0.4% Surfynol ® SB in 3GS | 0 | 0 | 7.7 |
| 0.4% Surfynol ® SE + 3% Isopar ® H in 3GS | 3.5 | 8.8 | 21.1 |

TABLE 13-continued

| Oil Composition in U-tube | Weight % of Oil Returned | | |
|---|---|---|---|
| | 6 Min | 10 Min | 20 Min |
| 0.4% Fluorinated polystyrene in 3GS | 0 | 0 | 9.7 |
| 0.4% Fluorinated polystyrene + 3% Isopar ® H in 3GS | 0 | 6.1 | 20.3 |

Results show oil return is better than with Zerol® 150 with addition of Zonyl® PHS/Isopar nixtures to 3GS. Surfynol® SE and the fluorinated polystyrene $CF_3(CF_2)_7(CH_2CHC_6H_5)_nCl$ are not effective oil return additives, performing worse than Isopar® H alone

EXAMPLE 14

The bottom of a vacuum flask was filled with either HAB, Zerol® 150 or 3GS lubricant to which was added 0.4% Zonyl® PHS and Isopar® H. A vacuum was drawn on the flask and foaming was observed. Different antifoam agents were slowly added until foaming was significantly reduced. Dow 200 antifoam agent is polydimethylsiloxane, 350 centistokes. Dow FS-1265 is trimethyl terminated trifluoropropyl methylsiloxane. Gelest FMV-4031 is vinyl terminated trifluoropropyl methylsiloxane. Gelest DMS-V52 is vinyl terminated polydimethyl siloxane. Results are shown in Table 14.

TABLE 14

| | Quantity needed to Reduce Foaming | | |
|---|---|---|---|
| | HAB with 0.4% Zonyl ® PHS + 3% Isopar | Zerol ® 150 with 0.4% Zonyl ® PHS + 3% Isopar | 3GS with 0.4% Zonyl ® PHS + 3% Isopar |
| Dow 200 | >5000 ppm | >500 ppm | 40 ppm |
| Dow FS-1265 | 30 ppm | | 100 ppm |
| FMV-4031 | 60 ppm | | 120 ppm |
| DMS-V52 | 200 ppm | 200 ppm | 200 ppm |

Results show, all antifoam agents tested are effective in 3GS mineral oil lubricant. Dow FS-1265, FMV-4031 and DMS-V52 are effective with alkylbenzene lubricants

EXAMPLE 15

The apparatus and procedure of Example 5, with exceptions discussed below, was used to test oil return of refrigerant R402A (38 wt % HCFC-22, 60 wt % HFC-125, and 2 wt % propane) with Zonyl® PHS and different antifoam agents. Dow FS-1265 is a trimethyl terminated trifluoropropyl methylsiloxane. Gelest FMV-4031 is vinyl terminated trifluoropropyl methylsiloxane. The constant temperature bath was held at 0° C. Results are shown in Table 15.

TABLE 15

| Oil Composition in U-tube | Weight % of Oil Returned | | |
|---|---|---|---|
| | 6 min | 10 min | 20 min |
| 3GS | 7.9 | 16.2 | 36.0 |
| Zerol ® 150 | 16.8 | 24.0 | 46.6 |
| 6% Isopar ® H in 3GS | 22.4 | 29.2 | 37.4 |
| 0.4% Zonyl ® PHS + 6% Isopar ® H in 3GS | 35.4 | 45.2 | 51.3 |
| 0.4% Zonyl ® PHS + 6% Isopar ® H + 130 ppm FMV-4031 in 3GS | 31.9 | 40.3 | 51.5 |

TABLE 15-continued

| Oil Composition in U-tube | Weight % of Oil Returned | | |
|---|---|---|---|
| | 6 min | 10 min | 20 min |
| 0.4% Zonyl ® PHS + 6% Isopar ® H + 110 ppm FS-1265 in 3GS | 31.3 | 40.2 | 52.0 |
| 0.4% Zonyl ® PHS + 6% Isopar ® H + 50 ppm Dow 200 in 3GS | 26.9 | 37.4 | 46.4 |

Results show addition of antifoam agent does not significantly effect oil return performance of Zonyl® PHS.

EXAMPLE 16

Zonyl® PHS was tested for thermal stability. Stainless steel, aluminum, and copper coupons were placed in sealed glass tubes containing R401A refrigerant, 3GS oil and 0.4 wt % Zonyl® PHS, optionally with 3 wt % Isopar® H. Tubes were held for 14 days at 175° C. Results are shown in Table 16.

TABLE 16

| After 14 Days at 175° C. | R401A/3GS/ Zonyl ® PHS | R401A/3GS/Zonyl ® PHS/Isopar ® H |
|---|---|---|
| Copper Appearance | Bright and shiny | Bright and shiny |
| Aluminum Appearance | Bright and shiny | Bright and shiny |
| Stainless Steel Appearance | Slightly dull | Slightly dull |
| Fluoride Ion (ppm) | 16.1 | 6.9 |
| Chloride Ion (ppm) | 16.4 | 13.0 |
| Acid Number (mg KOH/g) | <0.01 | <0.01 |

Results show Zonyl® PHS is thermally stable, has minimal effect on metals tested and causes no acid formation.

EXAMPLE 17

Viscosity of 3GS and HAB 22 lubricant oil samples were measured by ASTM method D446 to determine effect of oil-return agent addition. Results are shown in Table 16.

TABLE 17

| | Viscosity (centistokes) | | |
|---|---|---|---|
| | 25° C. | 40° C. | 100° C. |
| 3GS | 61.1 | 28.5 | 4.20 |
| 0.4% Zonyl ® PHS + 3% Isopar ® H in 3GS | 42.8 | 24.4 | 4.37 |
| Zerol ® 100 | 50.0 | 23.6 | 3.80 |
| 0.4% Zonyl ® PHS + 3% Isopar ® H in Zerol ® 100 | 42.9 | 25.5 | 3.90 |
| HAB 22 | 49.3 | 21.6 | 3.54 |
| 0.4% Zonyl ® PHS + 3% Isopar ® H in HAB 22 | 41.6 | 18.6 | 3.90 |

Results show a desirable trend in system viscosity. Oil/Zonyl® PHS viscosity is slightly higher at high temperature than pure oil which protects the compressor. Oil/Zonyl® PHS viscosity is lower at low temperature which aids oil flow through the evaporator.

EXAMPLE 18

Tests were conducted to determine if R404A (44 wt % HFC-125, 52 wt % HFC-143a, and 4 wt % HFC-134a) could be used in a Hussmann supermarket frozen food display case (Model HICA-0146-PLK), using conventional lubricant oil Suniso 3GS. The display case was outfitted with a Copeland semi-hermetic reciprocating compressor (Model KAL-016L) equipped with a sight glass in the oil sump. The frozen food case was installed in the indoor room of an environmental chamber and the condensing unit installed in the outdoor room. The two units were connected by ⅝ inch outer diameter copper tubing in the suction line and by ½ inch outer diameter copper tubing in the liquid line. A 300 cc sample cylinder was installed between two valves in the liquid line. To determine oil circulation, the valves were closed to trap a refrigerant/oil sample during system operation. The sample cylinder was removed and weighed, refrigerant slowly evaporated, then cylinder reweighed to determine amount of refrigerant. Weight of oil remaining was used to calculate % oil in refrigerant or % oil circulation. Refrigerant R502 (48.8 wt % HCFC-22, 51.2 wt % CFC-115 (chloropentafluoroethane)) with 3GS oil was used as a baseline for comparison. Results are shown in Table 18.

TABLE 18

| Refrigerant/Oil Combination | Oil Circulation (Wt %) | Capacity (Kbtu/H) | COP |
|---|---|---|---|
| R502/3GS | 0.16 | 3.26 | 1.67 |
| R404A/POE | 0.17 | 3.39 | 1.69 |
| R404A/3GS* | 0.12 | 3.31 | 1.70 |
| R404A/6% Isopar ® H in 3GS | 0.15 | 3.26 | 1.65 |
| R404A/0.4% Zonyl ® PHS + 6% Isopar ® H + 100 ppm Dow 200 + 120 ppm Dow FS 1265 | 0.16 | 3.36 | 1.71 |

*Oil level in sight glass dropped below view

No foaming was observed during the test employing the antifoam agents, and results show addition of Zonyl® PHS/Isopar® H/Antifoam provides comparable oil return to R502/3GS and R404A/POE refrigerant/oil combinations and also comparable capacity and efficiency. Zonyl® PHS/Isopar® H/Antifoam capacity and efficiency are also improved versus Isopar® H only. In the R404A/3GS test, oil level in the compressor sump dropped below view in the sight glass indicating oil may be trapped elsewhere in the system.

EXAMPLE 19

A Sears Coldspot refrigerator manufactured by Whirlpool with an Embraco reciprocating compressor was used to evaluate oil circulation. The refrigerator originally operated with CFC-12 (dichlorodifluoromethane) and mineral oil. The refrigerator was retrofitted to mixtures of R401A and Zerol® 150 alkylbenzene oil or Suniso 3GS mineral oil with Zonyl® PHS/Isopar® H. The freezer compartment was maintained at −18° C. and the refrigerated compartment at 3° C. Samples were taken for oil circulation and results are shown in Table 19.

TABLE 19

| | Wt % Oil Circulation | Steady State Watts Consumed |
|---|---|---|
| CFC-12/3GS | 1.60 | 164.4 |
| R401A/Zerol ® 150 | 1.85 | 166.4 |
| R401A/3G5 | 1.44 | 164.5 |
| R401A/(3G5 + 0.4% Zonyl ® PHS + 3% Isopar ® H) | 1.85 | 164.1 |

Temperature profiles in all tests were consistent. The R401A data show addition of Zonyl® PHS/Isopar® H to mineral oil provides oil circulation comparable to a retrofit to Zerol® 150. Oil circulation is also significantly improved versus CFC-12/mineral oil and R401A/mineral oil without oil return agent added. Energy efficiency could not be calculated directly, but watts consumed at steady state give an indication that power consumption was similar in all tests. Results indicate a retrofit to from CFC-12 to R401A could be performed without an oil change.

What is claimed is:

1. A refrigerant composition, comprising:
   (a) a halogenated hydrocarbon containing at least one carbon atom and one fluorine atom;
   (b) at least one oil selected from the group consisting of paraffins, naphthenes, aromatics, alkylaryls, synthetic paraffins and polyalphaolefins; and
   (c) a polymeric oil-return agent comprising a fluorinated polymer formed from at least one monomer selected from the group consisting of monomers represented by the formulae $CH_2=C(R^1)-CO_2-R^2$ and $CH_2=C(R^3)-C_6H_4-R^4$; wherein $R^1$ and $R^3$ are independently selected from the group consisting of hydrogen and $C_1$ through $C_4$ alkyl radicals; wherein $R^2$ and $R^4$ are independently selected from the group consisting of hydrocarbon radicals optionally containing oxygen and halogen atoms other than fluorine, and fluorinated hydrocarbon radicals optionally containing oxygen and halogen atoms other than fluorine; and wherein said oil-return agent comprises less than about 10 weight percent of said refrigerant composition.

2. The composition of claim 1, wherein said polymeric oil-return agent has a number-averaged molecular weight of at least about 3,000.

3. The composition of claim 1 wherein said polymeric oil-return agent has a number-averaged molecular weight of at least about 6,000.

4. The composition of claim 1 comprising from about 40 to about 99 weight percent halogenated hydrocarbon, from about 1 to about 60 weight percent oil, and from about 0.001 to about 10 weight percent polymeric oil-return agent.

5. The composition of claim 1 wherein said polymeric oil-return agent has a number-averaged molecular weight of at least about 10,000.

6. The composition of claim 1 wherein said polymeric oil-return agent is a polymer formed from at least one monomer represented by the formula $CH_2=C(R^1)-CO_2-R^2$, wherein: $R^1$ is selected from the group consisting of hydrogen and $C_1$ through $C_2$ alkyl radicals; and $R^2$ is selected from the group consisting of $C_1$ through $C_{20}$ alkyl radicals and $-CH_2CH_2-C_xF_{(2x+1)}$ radicals, wherein x is from 2 to 24.

7. The composition of claim 1 wherein said halogenated hydrocarbon contains from one to six carbon atoms, has a normal boiling point of from about −90° C. to about 80° C., and optionally contains chlorine and oxygen atoms.

8. The composition of claim 1, further comprising a hydrocarbon oil-return-agent carrier having at least 6 carbon atoms.

9. The composition of claim 1, further comprising an anti-foam agent.

10. The composition of claim 1 wherein said halogenated hydrocarbon is selected from the group consisting of: $CCl_2F_2$ (CFC-12), $CHCl_2F$ (HCFC-21), $CHClF_2$ (HCFC-22), $CHF_3$ (HFC-23), $CH_2ClF$ (HCFC-31), $CH_2F_2$ (HFC-32), $CH_3F$ (HFC-41), $CHCl_2CF_3$ (HCFC-123), $CHClFClF_2$ (HCFC-123a), $CHClFCF_3$ (HCFC-124), $CHF_2CClF_2$ (HCFC-124a), $CHF_2CF_3$ (HFC-125), $CH_2ClCF_3$ (HCFC-133a), $CHF_2CHF_2$ (HFC-134), $CH_2FCF_3$ (HFC-134a), $CClF_2CH_3$ (HCFC-142b), $CHF_2CH_2F$ (HFC-143), $CF_3CH_3$ (HFC-143a), $CHClFCH_3$ (HCFC-151a), $CHF_2CH_3$ (HFC-152a), $CHF_2CCl_2CF_3$ (HCFC-225aa), $CHClFCClFCF_3$ (HCFC-225ba), $CHF_2CClFCClF_2$ (HCFC-225bb), $CHCl_2CF_2CF_3$ (HCFC-225ca), $CHClFCF_2CClF_2$ (HCFC-225cb), $CHF_2CF_2CCl_2F$ (HCFC-225cc), $CCl F_2CHClCF_3$ (HCFC-225da), $CClF_2CHFCClF_2$ (HCFC-225ea), $CF_3CHFCCl_2F$ (HCFC-225eb), $CHF_2CClFCF_3$ (HCFC-226ba), $CHClFCF_2CF_3$ (HCFC-226ca), $CHF_2CF_2CClF_2$ (HCFC-226cb), $CF_3CHClCF_3$ (HCFC-226da), $CClF_2CHFCF_3$ (HCFC-226ea), $CHF_2CF_2CF_3$ (HFC-227ca), $CF_3CFHCF_3$ (HFC-227ea), $CHF_2CClFCHF_2$ (HCFC-235ba), $CH_2FCClFCF_3$ (HCFC-235bb), $CHClFCF_2CHF_2$ (HCFC-235ca), $CH_2ClCF_2CF_3$ (HCFC-235cb), $CH_2FCF_2CClF_2$ (HCFC-235cc), $CHF_2CHClCF_3$ (HCFC-235da), $CHClFCHFCF_3$ (HCFC-235ea), $CHF_2CHFCClF_2$ (HCFC-235eb), $CClF_2CH_2CF_3$ (HCFC-235fa), $CHF_2CF_2CHF_2$ (HFC-236ca), $CH_2FCF_2CF_3$ (HFC-236cb), $CHF_2CHFCF_3$ (HFC-236ea), $CF_3CH_2CF_3$ (HFC236fa), $CH_2FCF_2CHF_2$ (HFC-245ca), $CH_3CF_2CF_3$ (HFC-245cb), $CHF_2CHFCHF_2$ (HFC-245ea), $CH_2FCHFCF_3$ (HFC-245eb), $CHF_2CH_2CF_3$ (HFC-245fa), $CH_2FCF_2CH_2F$ (HFC-254ca), $CH_2CF_2CHF_2$ (HFC-254cb), $CH_2FCHFCHF_2$ (HFC-254ea), $CH_3CHFCF_3$ (HFC-254eb), $CHF_2CH_2CHF_2$ (HFC-254fa), $CH_2FCH_2CF_3$ (HFC-254fb), $CH_3CF_2CH_3$ (HFC-272ca), $CH_3CHFCH_2F$ (HFC-272ea), $CH_2FCH_2CH_2F$ (HFC-272fa), $CH_3CH_2CF_2H$ (HFC-272fb), $CH_3CHFCH_3$ (HFC-281ea), $CH_3CH_2CH_2F$ (HFC-281fa), $CF_3CF_2CF_2CF_2H$ (HFC-329p), $CF_3CF_2CFHCF_3$ (HFC-329me), $CF_3CF_2CF_2CFH_2$ (HFC-338q), $CF_3CF_2CH_2CF_3$ (HFC-338mf), $CF_3CF_2CFHCF_2H$ (HFC-338pe), $CF_3CFHCF_2CF_2H$ (HFC-338pce), $CHF_2CF_2CF_2CF_2H$ (HFC-338pcc), $CF_3CFHCFHCF_3$ (HFC-338mee), $CF_3CF_2CF_2CF_2CF_2H$ (HFC-42-11p), $CF_3CF_2CFHCF_2CF_3$ (HFC-42-11mce), $CF_3CF_2CF_2CFHCF_3$ (HFC-42-11me), $CF_3CF_2CH_2CF_2CF_3$ (HFC-43-10mcf), $CF_3CF_2CF_2CH_2CF_3$ (HFC-43-10mf), $CF_3CF_2CF_2CF_2CFH_2$ (HFC-43-10q), $CF_3CF_2CF_2CFHCF_2H$ (HFC-43-10pe), $CF_3CF_2CFHCF_2CF_2H$ (HFC-43-10pce), $CF_3CHFCHFCF_2CF_3$ (HFC-43-10mee), $CF_2HCF_2CF_2CF_2CF_2H$ (HFC43-10pccc), $CF_3CFHCF_2CF_2CF_2H$ (HFC-43-10pcce), $CF_3CFHCF_2CFHCF_3$ (HFC-43-10mece), $CF_3CF_2CF_2CF_2CF_2CF_2H$ (HFC-52-13p), $C_4F_9OCH_3$, and $C_4F_9OC_2H_5$.

11. The composition of claim 1 wherein said halogenated hydrocarbon is selected from the group consisting of: $CHClF_2$ (HCFC-22), $CHF_3$ (HFC-23), $CH_2F_2$ (HFC-32), $CHClFCF_3$ (HCFC-124), $CHF_2CF_3$ (HFC-125), $CHF_2CHF_2$ (HFC-134), $CH_2FCF_3$ (HFC-134a), $CF_3CH_3$ (HFC-143a), $CHF_2CH_3$ (HFC-152a), $CHF_2CF_2CF_3$ (HFC-227ca), $CF_3CFHCF_3$ (HFC-227ea), $CF_3CH_2CF_3$ (HFC-236fa), $CHF_2CH_2CF_3$ (HFC-245fa), $CHF_2CF_2CF_2CF_2H$ (HFC-338pcc), and $CF_3CHFCHFCF_2CF_3$ (HFC-43-10mee).

12. The refrigerant composition of claim 1 wherein the halogenated hydrocarbon is selected from the group consisting of azeotropic or azeotrope-like compositions consisting essentially of: HCFC-22, HFC-152a, and HCFC-124; HFC-125, HFC-143a, and HFC-134a; HFC-32, HFC-125, HFC-134a; HCFC-22, HFC-143a, and HFC-125; HCFC-22, HCFC-124, HCFC-142b; HFC-32 and HFC-125; and HFC-125 and HFC-143a.

13. The refrigerant composition of claim 1 further comprising up to 10 weight percent of at least one $C_3$ to $C_5$ hydrocarbon.

14. A process for producing refrigeration comprising evaporating a composition of claim 1 in the vicinity of a body to be cooled.

15. A process comprising condensing a composition of claim 1 for producing heat in the vicinity of a body to be heated.

16. The composition of claim 1 wherein the polymeric oil-return agent contains at least about 10 weight percent fluorine.

* * * * *